(12) United States Patent
Kawatani

(10) Patent No.: US 12,405,127 B2
(45) Date of Patent: Sep. 2, 2025

(54) APPARATUS INFORMATION DISPLAY DEVICE

(71) Applicant: HONDA MOTOR CO., LTD., Tokyo (JP)

(72) Inventor: Takeshi Kawatani, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 271 days.

(21) Appl. No.: 18/127,697

(22) Filed: Mar. 29, 2023

(65) Prior Publication Data

US 2023/0314155 A1 Oct. 5, 2023

(30) Foreign Application Priority Data

Mar. 31, 2022 (JP) ................................ 2022-061095

(51) Int. Cl.
| | | |
|---|---|---|
| *G01C 21/36* | (2006.01) | |
| *B60K 35/22* | (2024.01) | |
| *B60K 35/28* | (2024.01) | |
| *B60K 35/60* | (2024.01) | |
| *B60K 35/65* | (2024.01) | |
| *B60K 35/81* | (2024.01) | |
| *B60K 35/215* | (2024.01) | |

(52) U.S. Cl.
CPC .......... *G01C 21/3632* (2013.01); *B60K 35/22* (2024.01); *B60K 35/28* (2024.01); *B60K 35/60* (2024.01); *B60K 35/654* (2024.01); *B60K 35/81* (2024.01); *B60K 35/215* (2024.01)

(58) Field of Classification Search
CPC ........ B60K 35/22; B60K 35/28; B60K 35/60; B60K 35/654; B60K 35/81; B60K 35/215; G01C 21/3632
See application file for complete search history.

(56) References Cited

U.S. PATENT DOCUMENTS

| | | | |
|---|---|---|---|
| 10,543,812 B1 * | 1/2020 | Green | .............. H04N 23/57 |
| 2012/0274458 A1 | 11/2012 | Wagner | |
| 2017/0329143 A1 * | 11/2017 | Svarichevsky | ......... G06F 3/011 |

FOREIGN PATENT DOCUMENTS

| | | | |
|---|---|---|---|
| CN | 206561808 | | 10/2017 |
| JP | 2002-350144 | | 12/2002 |
| JP | 2010-236894 | | 10/2010 |
| JP | 2020-001454 | | 1/2020 |
| JP | 2020001454 A | * | 1/2020 |

OTHER PUBLICATIONS

Japanese Office Action for Japanese Patent Application No. 2022-061095 mailed Jul. 25, 2023.

* cited by examiner

*Primary Examiner* — Charles J Han
(74) *Attorney, Agent, or Firm* — Amin, Turocy & Watson, LLP

(57) ABSTRACT

An information display device of an apparatus includes: a standing member that stands upward in front of an operation position and has a lower portion which is supported by an apparatus main body; and a light guide member that extends from an apparatus main body side toward an upper portion side of the standing member, is arranged along a predetermined portion of the standing member, and causes at least part of the upper portion side of the standing member to emit light.

9 Claims, 5 Drawing Sheets

APPARATUS INFORMATION DISPLAY DEVICE

CROSS-REFERENCE TO RELATED APPLICATION

Priority is claimed on Japanese Patent Application No. 2022-061095, filed on Mar. 31, 2022, the contents of which are incorporated herein by reference.

BACKGROUND

Field of the Invention

The present invention relates to an information display device of an apparatus.

Background

In the related art, a configuration is known which displays navigation information on a meter device of a vehicle (for example, refer to Japanese Unexamined Patent Application, First Publication No. 2002-350144).

SUMMARY

However, in the above-described configuration of the related art, a driver alternately views a vehicle forward direction (travel direction) and the meter device, and there is a problem in that the movement of the eye line is frequent and leads to fatigue.

An aspect of the present invention provides an information display device of an apparatus capable of preventing the movement of an eye line and displaying information to an operator of the apparatus.

An apparatus information display device according to a first aspect of the present invention is an information display device of an apparatus that is operated by an operator, including: a standing member that stands upward in front of an operation position of the apparatus and has a lower portion which is supported by an apparatus main body; and a light guide member that extends from an apparatus main body side toward an upper portion side of the standing member, is arranged along a predetermined portion of the standing member, and causes at least part of the upper portion side of the standing member to emit light.

According to this configuration, by causing the upper portion side of the standing member located in the front of the operation position to emit light, it is possible to efficiently perform information display such as direction indication for the operator. Since the standing member stands at the front of the operation position of the apparatus, it is possible to perform information transmission to the operator while reducing the eye line movement for confirming information by the operator.

In a second aspect, the standing member may be a transparent or translucent panel member, and the light guide member may be constituted of a transparent or translucent optical fiber.

According to this configuration, even when the light guide member is arranged on a transparent standing member such as a windscreen of a vehicle, the light guide member can be inconspicuous, and it is possible to maintain a good appearance.

In a third aspect, the light guide member may be arranged to be inserted in the inside in a horizontal cross-section of the standing member.

According to this configuration, the light guide member can be inconspicuous, and it is possible to improve the appearance. Both the front and rear surfaces of the standing member when seen from the operation position can be easily maintained to be smooth. It is possible to prevent disturbance from reaching the light guide member.

In a fourth aspect, the light guide member may be arranged to be exposed to any one of a first surface of the standing member that faces an operation position side and a second surface of the standing member that faces an opposite side of the operation position.

According to this configuration, the light guide member can be easily arranged, and it is possible to facilitate manufacturing of the standing member that incorporates the light guide member.

In a fifth aspect, the light guide member may be arranged along the outer circumferential edge of the standing member.

According to this configuration, the light guide member can be easily arranged, and it is possible to facilitate manufacturing of the standing member that incorporates the light guide member. Both the front and rear surfaces of the standing member when seen from the operation position can be maintained to be smooth.

In a sixth aspect, a light source that causes a light emission portion of the standing member to emit light via the light guide member may be arranged on the apparatus main body.

According to this configuration, it is possible to reduce the weight of the standing member and reduce shaking, vibration, and the like of the standing member compared to a case where the light source is arranged on the standing member. Even in a configuration where the standing member moves upward and downward, the load of an actuator can be reduced.

In a seventh aspect, the apparatus may be a saddle riding vehicle on which a driver rides by straddling a vehicle body, and the standing member may constitute a windscreen that is arranged on an upper portion of a front cowl at a vehicle body front part.

According to this configuration, the information display device can be used as an indicator lamp such as a winker and a driving assist system included in the saddle riding vehicle, or can be used as a display device of a travel direction of a navigation system. As a result, information provided to the driver during traveling of the vehicle can be provided to the driver with a little eye line movement.

In an eighth aspect, the apparatus may be an automobile on which a driver rides, the automobile may have an output device that outputs navigation information, and a plurality of light emission portions of the standing member may be provided to be distributed to right and left sides of a vehicle body, be arranged symmetrically in a rightward-leftward direction with respect to a vehicle body rightward-leftward middle, and emit light in response to the navigation information.

According to this configuration, information (for example, right-left turn information of a course) relating to the right and left sides of the vehicle body in the navigation information can be easily confirmed with a little eye movement.

In a ninth aspect, the navigation information may be right-left turn information in a travel direction of the automobile, and the light emission portion may display the right-left turn information in response to the navigation information, and vehicle speed and position information of the automobile.

According to this configuration, for example, when the vehicle speed of the automobile is fast, the right-left turn information can be displayed at an early timing from a position in front of and sufficiently away from a right-left turn position, and when the vehicle speed of the automobile is slow, the right-left turn information can be displayed at a late timing from a position relatively close to a right-left turn position. In this way, the light emission timing of the right-left turn information can be optimized in response to the vehicle speed and the position information of the automobile.

According to an aspect of the present invention, it is possible to provide an information display device of an apparatus capable of preventing the movement of an eye line and displaying information to an operator of the apparatus.

DESCRIPTION OF EMBODIMENTS

Figure 1:
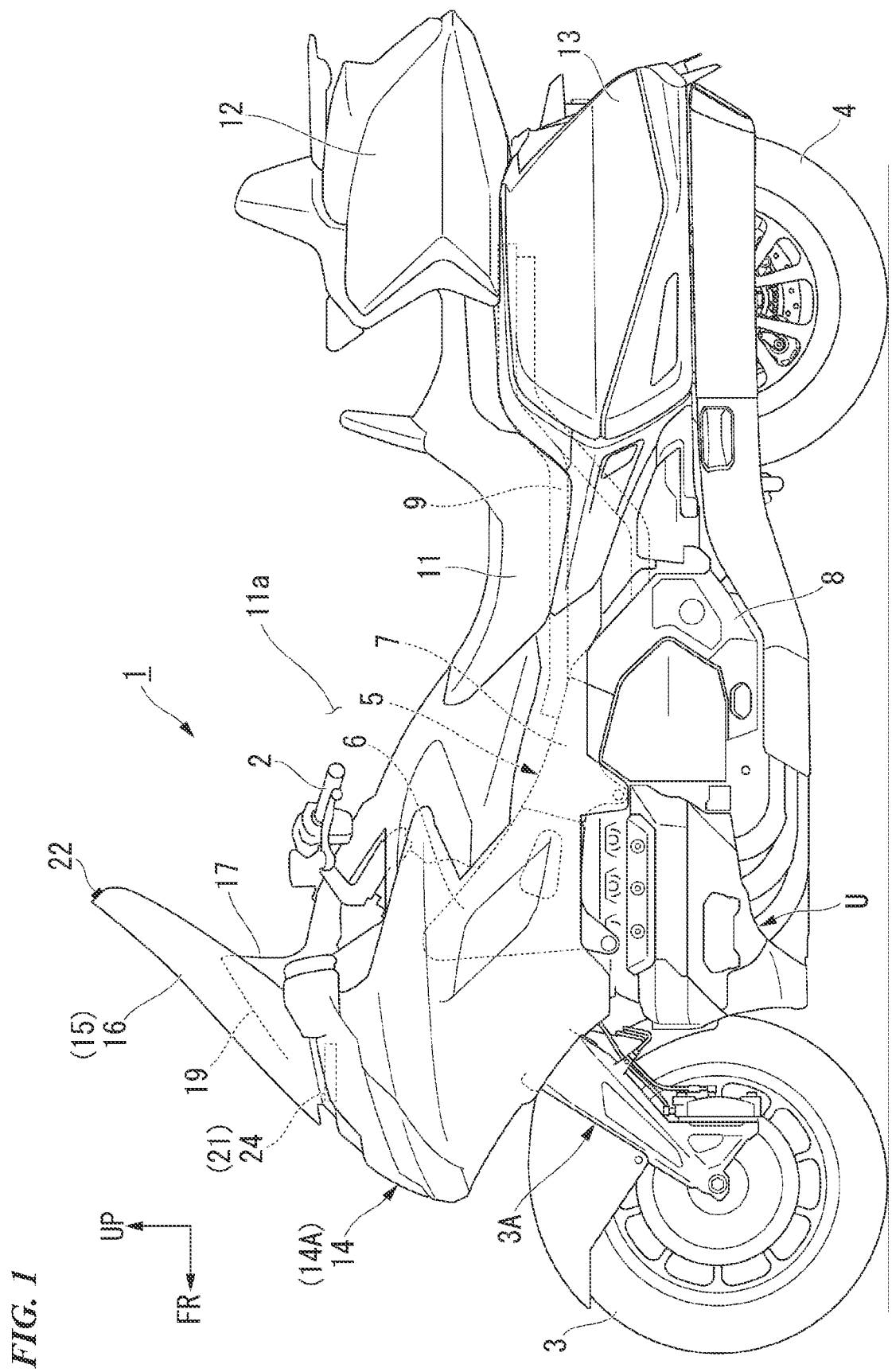
FIG. 1 is a left side view of a motorcycle in an embodiment of the present invention.
Figure 2:
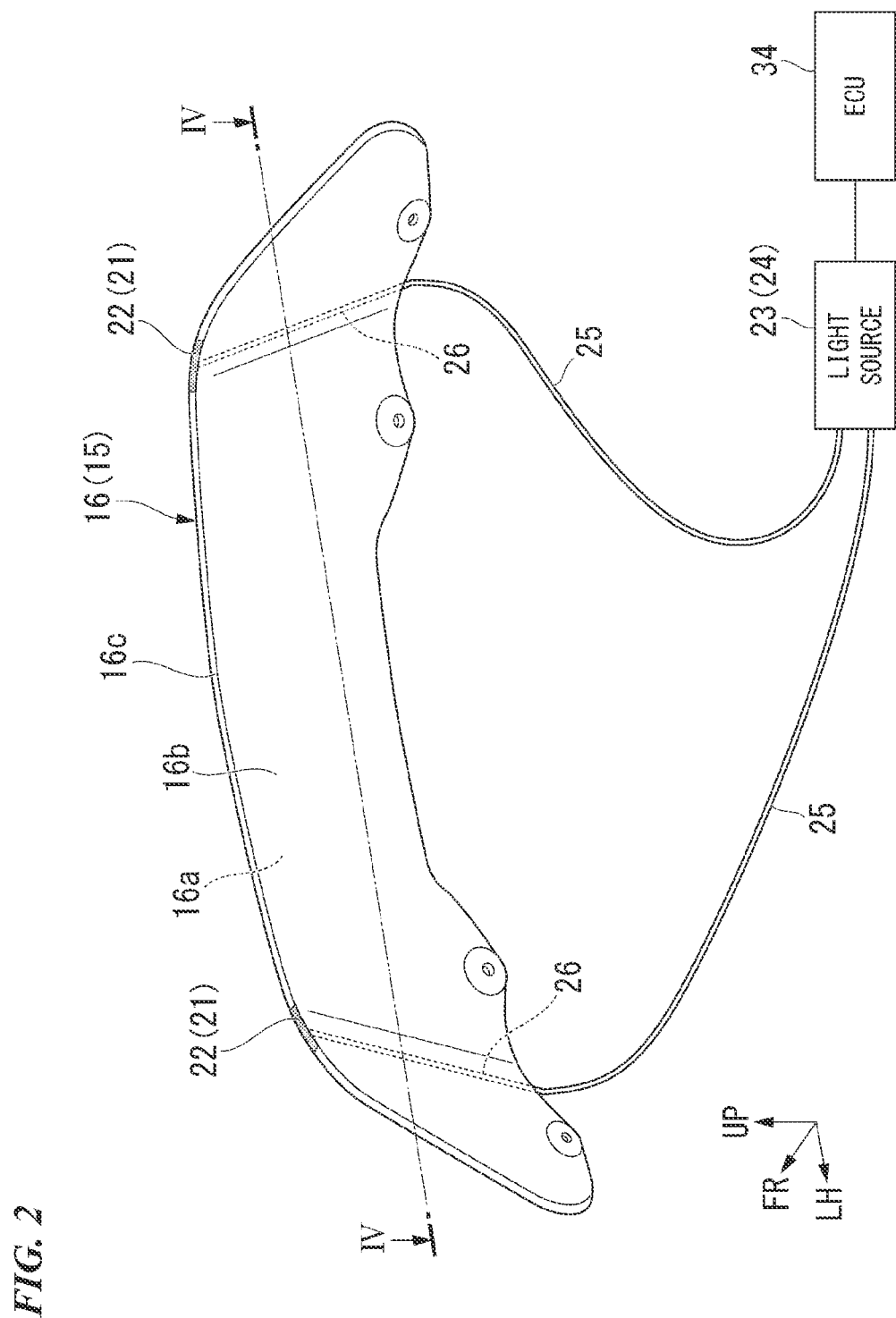
FIG. 2 is a view showing an information display device that is provided on a windscreen of the motorcycle described above.

Hereinafter, an embodiment of the present invention will be described with reference to the drawings. Directions such as forward, rearward, rightward, and leftward directions in the following description are the same as those in a vehicle described below unless otherwise stated. In appropriate positions in the drawings used in the following description, an arrow FR that indicates a vehicle forward direction, an arrow LH that indicates a vehicle leftward direction, an arrow UP that indicates a vehicle upward direction, and a line CL that indicates a vehicle body rightward-leftward middle are shown.

<Entire Vehicle>

FIG. 1 shows a motorcycle (apparatus) 1 of the present embodiment. The motorcycle 1 includes a front wheel 3 that is steered by a handle (operation handle) 2 and a rear wheel 4 that is driven by a power unit U. The motorcycle 1 is a saddle riding vehicle on which a driver (operator) rides by straddling a vehicle body and is able to swing (bank) the vehicle body in a rightward-leftward direction (roll direction) with reference to ground contact points of the front and rear wheels 3, 4. The vehicle of the embodiment includes not only a vehicle that rotates in a direction in which the vehicle body is banked like the motorcycle 1 but also a vehicle that rotates by the steering of a steering wheel without banking the vehicle body.

The front wheel 3 of the motorcycle 1 is supported by a front wheel suspension device 3A. The front wheel suspension device 3A is supported by a front end block 6 of a vehicle body frame 5. A bar handle 2 for steering the front wheel rotation is arranged above the front wheel suspension device 3A. A pair of right and left main frames 7 extend diagonally downward and rearward at a rearward position of the front end block 6 of the vehicle body frame 5. Each of rear end portions of the right and left main frames 7 is connected to each of a pair of right and left pivot frames 8. A power unit U that includes, for example, an engine (internal combustion engine) is provided at a lower position of the right and left main frames 7 and a forward position of the right and left pivot frames 8.

A front end portion of a swing arm (not shown) is supported by the right and left pivot frames 8. The rear wheel 4 of the motorcycle 1 is supported by a rear end portion of the swing arm. A rear cushion (not shown) is provided between the swing arm and the vehicle body frame 5.

A rear frame 9 is connected to rear portions of the right and left main frames 7 and the right and left pivot frames 8. A seat 11 for seating an occupant is arranged above the rear frame 9. A rear storage box 12 is arranged at a rearward position of the seat 11. Right and left saddle bags 13 are arranged on right and left sides below the rear storage box 12.

A vehicle body front part 14A of the motorcycle 1 is covered by a front cowl 14. A windscreen 15 is arranged above a front portion of the front cowl 14. The windscreen includes a screen main body 16 (a standing member, a panel member) made of a transparent or translucent resinous material such as a polycarbonate resin. The screen main body 16 stands upward from a vehicle body side (lower end portion side) at a forward position of a driving position (operation position) 11a at which the driver performs driving of the motorcycle 1. The screen main body 16 extends diagonally rearward and upward from the vehicle body side.

An upper end height of the screen main body 16 is equivalent to an eye height of the driver. The driver can view a vehicle forward direction through the screen main body 16.

The screen main body 16 is constituted, for example, to be capable of moving upward and downward by a drive force of an electric actuator. A lower portion of the screen main body 16 is supported by the vehicle body front part (apparatus main body) 14A that includes the front cowl 14 and the vehicle body frame 5 via an arm or the like which extends from the electric actuator.

A meter device 17 is arranged at a forward position of the handle 2 and inside the front cowl 14. The meter device 17 is, for example, separated from a steering-system component and is supported by the front cowl 14 or the vehicle body frame 5. The meter device 17 includes, for example, a meter of a vehicle speed, an engine rotation speed, and the like, and a display screen 18 (refer to FIG. 3) such as a liquid crystal display that displays an image of various information. A meter visor 19 that extends diagonally rearward and upward along the windscreen 15 is arranged on an upper portion of the meter device 17.

<Information Display Device>

Next, an information display device 21 that includes a light emission portion 22 and is arranged on the screen main body 16 is described.

As shown in FIG. 1 to FIG. 4, the information display device 21 includes: a pair of right and left light emission portions 22 that are arranged on an upper end edge (a standing front end edge, an end surface) 16c of the screen main body 16; a light unit 24 that is arranged on the vehicle body front part 14A and includes a light source 23 and the like; and a light guide member 25 that extends upward from the light unit 24 to arrive at the right and left light emission portions 22 at an upper end of the screen main body 16 and guides light of the light source 23 to the light emission portion 22.

The left light emission portion 22 is arranged on a left side of the vehicle body rightward-leftward middle CL. The right light emission portion 22 is arranged on a right side of the vehicle body rightward-leftward middle CL. The right and left light emission portions 22 are arranged symmetrically in a rightward-leftward direction with respect to the vehicle body rightward-leftward middle CL. The right and left light emission portions 22 are controlled to perform a predetermined light emission display (lighting or blinking). The light emission of the right and left light emission portions 22 notifies the driver of predetermined information. The predetermined information includes, for example, winker operation information by light emission that interlocks with right and left winkers, right-left turn information of a travel direction in response to the navigation information or the like, notification and warning information relating to a driving assist control, an automated driving control, and the like of the motorcycle 1, and the like.

The light unit 24 is supported by the front cowl 14 or the vehicle body frame 5 at the inside of the front cowl 14. The light unit 24 includes the light source 23 of the right and left light emission portions 22 and an electric power supply circuitry (driver). The light sources 23 of the right and left light emission portions 22 are provided separately from each other. Hereinafter, the light sources 23 of the right and left light emission portions 22 are referred to as right and left light sources 23. Each of the right and left light sources 23 is, for example, an LED but may be an incandescent bulb. The emission light of each of the right and left light sources 23 is separately guided to each of the right and left light emission portions 22 by the light guide member 25 using an optical fiber.

By arranging the light unit 24 that includes the light source 23 on the vehicle body side (for example, a back side of the meter device 17 when seen from the driving position 11a), the weight of the screen main body 16 is reduced compared to the case where the light source 23 is arranged on the screen main body 16. In an electric windscreen 15, the load of the electric actuator can be reduced. Compared to the case where the light source 23 is arranged on the screen main body 16, the light source 23 does not enter the field of view of the driver, and it is possible to prevent the driver from becoming distracted. The light unit 24 does not interfere with the display of the meter device 17.

The light guide member 25 defines a form, for example, as an optical fiber cable formed of a plurality of bundled optical fiber core wires. The optical fiber is made of a material having a high refractive index such as transparent glass or a transparent resinous material such as an acrylic resin or a polycarbonate resin. The optical fiber and the light guide member 25 have flexibility. The light guide member 25 is transparent or translucent and is less conspicuous even when arranged on a transparent or translucent screen main body 16. The light guide member 25 may be a molded component that is formed to be along a predetermined portion of the screen main body 16.

In the motorcycle 1, an occupant (driver) seated on the seat 11 drives the motorcycle 1 while looking in the vehicle forward direction. The windscreen 15 is arranged at a forward position the driving position 11a above the seat 11. The windscreen 15 is located at a height which enters the field of view of the driver when the driver seated on the seat 11 sees the vehicle forward direction. The light guide member that is arranged on the windscreen 15 (screen main body 16) becomes inconspicuous, and thereby, it is possible to prevent the driver from becoming distracted.

The light guide member 25 extends from the light unit 24 that is arranged on the vehicle body front part 14A side. A pair of right and left light guide members 25 are provided to extend from the right and left light sources 23 to the right and left light emission portions 22. The screen main body 16 defines a gently curved shape that protrudes forward in plan view. The right and left light guide members 25 extend in an upward-downward direction so as to form a virtual bend line on right and left side portions of the screen main body 16. Each of the right and left light guide members 25 is arranged in a straight line form to an upper portion from a lower portion of the screen main body 16. The right and left light guide members 25 are inserted into an insertion portion 26 formed in a horizontal cross-section of the screen main body 16.

Reference numeral 16b in the drawings indicates a surface (rear surface) on the front side of the screen main body 16 when seen from the driving position 11a, and reference numeral 16a in the drawings indicates a surface (front surface) on the back side of the screen main body 16 when seen from the driving position 11a. In the horizontal cross-section of the screen main body 16, for example, a front surface projection portion 26a that projects forward from the front surface 16a (second surface) is formed on the front surface 16a side of the insertion portion 26, and a rear surface projection portion 26b that projects rearward from the rear surface 16b (first surface) is formed on the rear surface 16b side of the insertion portion 26. The light guide member 25 is arranged along the front and rear surfaces 16a, 16b of the screen main body 16.

The light guide member 25 has an incident surface at one end in a longitudinal direction. The incident surface faces and is adjacent to the light source 23 (LED) from an irradiation direction. Light of the light source 23 enters the incident surface, and the light guide member 25 guides the light along the longitudinal direction. In the light guide member 25, most of the light introduced from the incident surface is totally reflected within the light guide member 25. The incident light into the light guide member 25 is guided along the longitudinal direction of the light guide member 25 while repeating reflection within the light guide member 25. Another end in the longitudinal direction of the light guide member 25 is a light emission surface, and the light introduced into the light guide member 25 is emitted from the light emission surface. The light emission surface of the light guide member 25 reaches an upper end edge 16c of the screen main body 16. A light emission portion 22 that diffuses the light emission of the light emission surface of the light guide member 25 to a predetermined shape is arranged on both right and left sides of the upper end edge 16c of the screen main body 16.

The light emission portion 22 is not limited to a configuration that is arranged on the upper end edge 16c of the screen main body 16 and may be arranged on an upper end portion that includes a width of about 10 to 20 mm from the upper end edge 16c. The light emission portion 22 may be arranged in an upper range (upper portion) than the middle in the upward-downward direction of the screen main body 16.

When the upper end edge 16c is curved, for example, a portion having an angle of less than 45 degrees with respect to the horizontal plane is defined as the upper end edge 16c. The upper end edge 16c is provided in a range having a predetermined width in the rightward-leftward direction.

By arranging the light guide member 25 to be inserted into the cross-section of the screen main body 16, the light guide member 25 becomes inconspicuous, the front and rear surfaces 16a, 16b of the screen main body 16 can be easily maintained to be smooth, and it is possible to prevent disturbance from reaching the light guide member 25.

Figure 5:
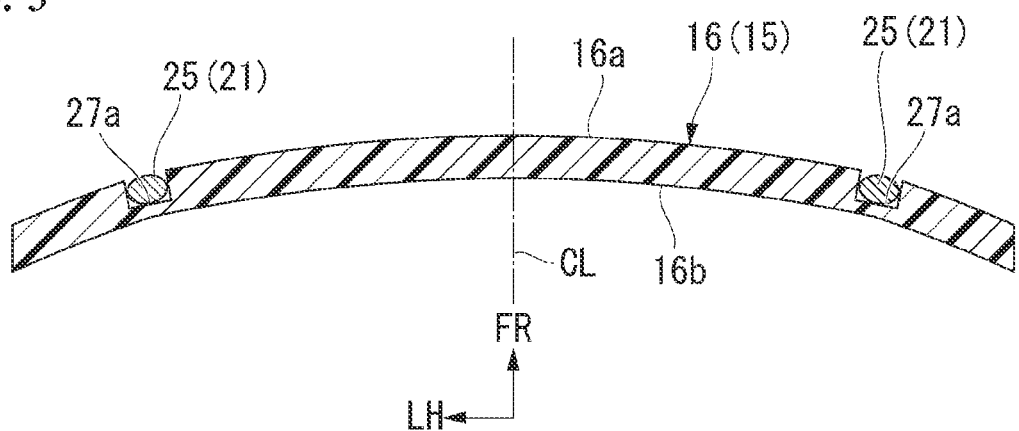
FIG. 5 is a cross-sectional view corresponding to FIG. 4 and showing a modification example of the embodiment.

The example of FIG. 5 shows a form in which a groove 27b for arranging the light guide member 25 is formed on the rear surface 16b of the screen main body 16, and the light guide member 25 is fitted into the groove 27b and fixed.

Figure 6:
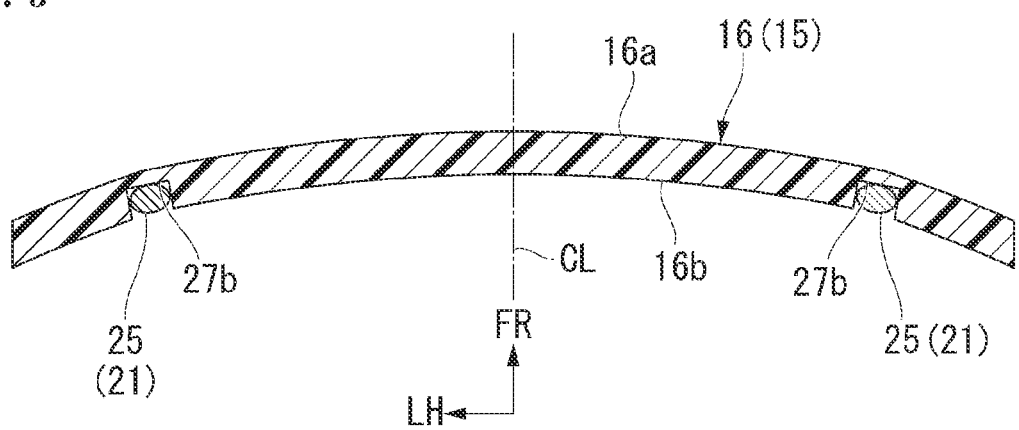
FIG. 6 is a cross-sectional view corresponding to FIG. 4 and showing a second modification example of the embodiment.

Further, the example of FIG. 6 shows a form in which a groove 27a for arranging the light guide member 25 is formed on the front surface 16a of the screen main body 16, and the light guide member 25 is fitted into the groove 27a and fixed.

The grooves 27a, 27b in which the light guide member 25 is fitted may be sealed by an adhesive or the like. However, regardless of the presence or absence of the sealing, the forms of FIG. 5 and FIG. 6 show that the light guide member 25 is arranged to be exposed to the front surface 16a side or the rear surface 16b side of the screen main body 16.

In the forms of FIG. 5 and FIG. 6, it is conceivable that the smoothness on the front surface 16a side or the rear surface 16b side of the screen main body 16 may be affected, and the appearance or the like may be affected; however, a long light guide member 25 can be easily arranged along the front and rear surfaces 16a, 16b of the screen main body 16, and it is possible to facilitate manufacturing of the screen main body 16 that incorporates the light guide member 25.

Figure 7:
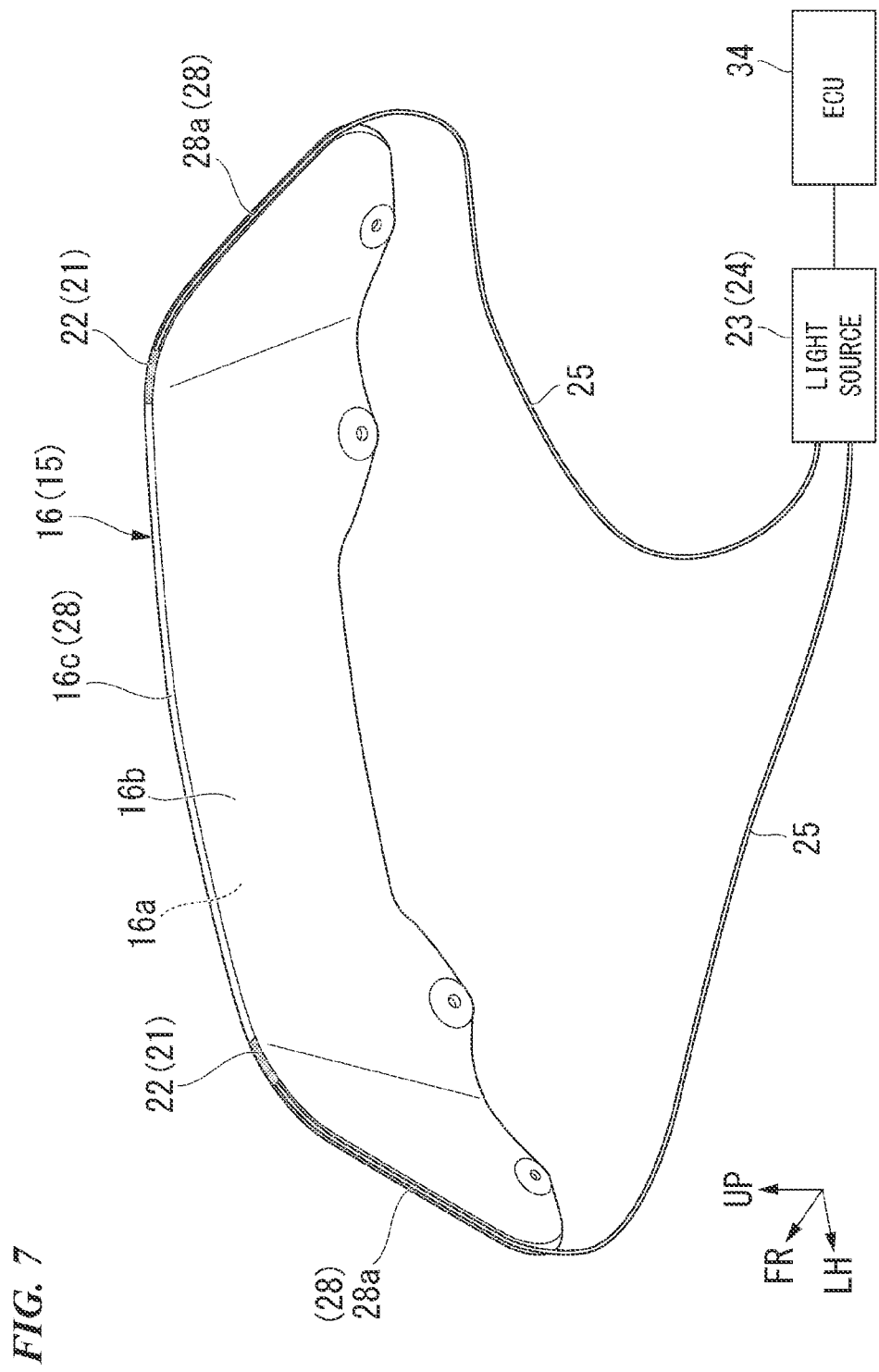
FIG. 7 is a view corresponding to FIG. 2 and showing a third modification example of the embodiment.

The example of FIG. 7 shows a form in which the light guide member 25 is arranged along the outer circumferential edge 28 of the screen main body 16 when seen from a vehicle forward-rearward direction. The outer circumferential edge 28 includes an upper end edge 16c and right and left side edges 28a.

In the form of FIG. 7, a long light guide member 25 can be further easily arranged, and it is possible to further facilitate manufacturing of the screen main body 16 that incorporates the light guide member 25. The grooves 27a, 27b and the light guide member 25 shown in FIG. 5 and FIG. 6 are eliminated from the front and rear surfaces 16a, 16b of the screen main body 16, and it is possible to maintain the front and rear surfaces 16a, 16b to be smooth.

<System Configuration>

Figure 3:
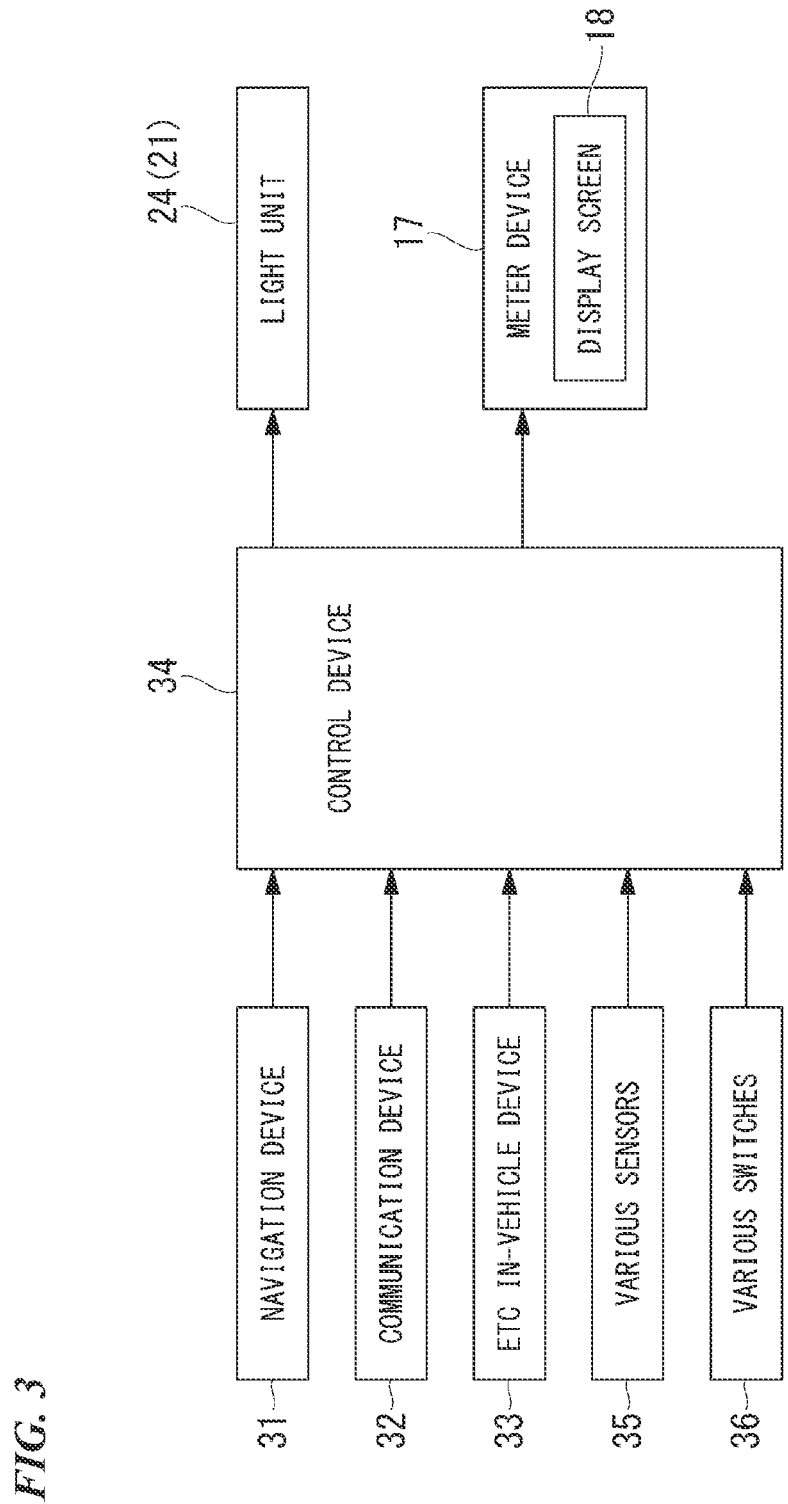
FIG. 3 is a block diagram of a vehicle system that includes the information display device.
Figure 4:
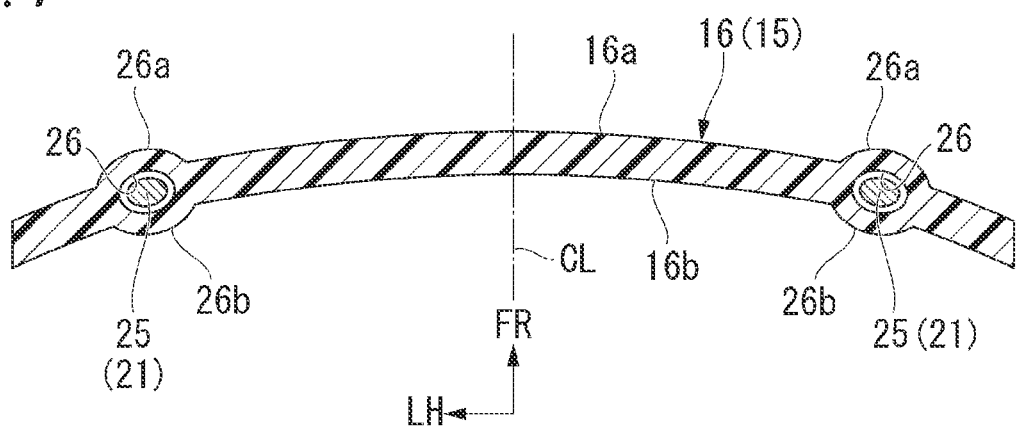
FIG. 4 is a IV-IV cross-sectional view of FIG. 2.

FIG. 3 is a block diagram of a vehicle system that includes the information display device 21 in the embodiment.

The motorcycle 1 includes a meter device 17, an information display device 21 (light unit 24), a navigation device 31, a communication device 32, an ETC (electronic toll collection system) in-vehicle device 33, and a control device 34.

The navigation device 31 communicates with the outside and thereby performs route guidance or the like for the occupant.

The communication device 32 is a portable terminal that is owned by the occupant and is capable of communicating with the outside and is a so-called smartphone, a tablet terminal, or the like. The communication device 32 includes an application (a software module that provides various functions to a user, that is, an occupant of the motorcycle 1) having various functions such as a navigation function.

The ETC in-vehicle device 33 exchanges toll information with a tollbooth of a toll road when the motorcycle 1 travels on the toll road.

Information from the navigation device 31, the communication device 32, and the ETC in-vehicle device 33 are input to the control device 34, and the control device 34 controls display of each of the meter device 17 and the information display device 21. The control device 34 is an ECU (electronic control device) and realizes various functions by executing a program stored in a memory (not shown). Various sensors 35 and various switches 36 are connected to the control device 34.

<Information Display Example>

The information display device 21 of the embodiment displays guidance information (right-left turn information of the travel direction) in conjunction with the navigation device 31. For example, when the travel direction of the motorcycle 1 is a left turn direction at a predetermined guidance point, the control device 34 lights the light source 23 on the left side and lights or blinks the light emission portion 22 on the left side at the upper end of the screen main body 16 on the basis of route guidance information that is input from the navigation device 31. When the travel direction of the motorcycle 1 is a right turn direction at a predetermined guidance point, the control device 34 lights the light source 23 on the right side and lights or blinks the light emission portion 22 on the right side at the upper end of the screen main body 16. When the motorcycle 1 turns right or left and the guidance contents are executed, the control device 34 stops the lighting of the light source 23 and switches the light emission portion 22 to be in an OFF state.

For example, when the motorcycle 1 does not execute the right-left turn guidance contents (when passing), light emission such as simultaneous blinking of the right and left light emission portions 22 may be performed, and the driver may be alerted.

Further, when the motorcycle 1 is approaching a guidance point of a right-left turn, light emission such as simultaneous blinking of the right and left light emission portions 22 may be performed, and the driver may be notified of approaching the guidance point.

Alternatively, a plurality of light emission portions 22 may be provided on each of right and left sides, and the number of light emissions may be increased or decreased depending on the distance to the guidance point.

Information (navigation information) from the navigation device 31 is output, for example, to the display screen 18 (output device) of the meter device 17. The light emission of the right and left light emission portions 22 of the information display device 21 is performed in accordance with the information (for example, right-left turn information of the course) relating to the vehicle body right and left sides in the navigation information.

The light emission of the right and left light emission portions 22 may display the right-left turn information of the course by additionally using the vehicle speed and the position information of the motorcycle 1 in addition to the navigation information.

That is, the information display device 21 may display the right-left turn information at an early timing from a position in front of and sufficiently away from the right-left turn position when the vehicle speed of the motorcycle 1 is fast, and may display the right-left turn information at a late timing from a position relatively close to the right-left turn position when the vehicle speed of the motorcycle 1 is slow. In this way, by changing the light emission timing of the right-left turn information in accordance with the vehicle speed and the position information of the motorcycle 1, it is possible to provide the right-left turn information with a margin and also optimize the light emission time of the right and left light emission portions 22.

There may be a configuration in which the motorcycle 1 does not include the navigation device 31. That is, a configuration may be employed in which an application of the communication device 32 performs the route guidance. A configuration may be employed in which the motorcycle 1 is connectable to (capable of communicating with) the communication device 32 in a wired or wireless manner, and the navigation information received from the communication device 32 is output to the meter device 17 and is displayed on the display screen 18.

As described above, the information display device 21 of the apparatus in the embodiment described above includes: the screen main body 16 that stands upward in front (at a forward position) of the driving position 11a of the motorcycle 1 and has a lower portion which is supported by the vehicle body front part 14A; and the light guide member 25 that extends from the vehicle body front part 14A side toward the upper portion side of the screen main body 16, is arranged along the predetermined portion of the screen main body 16, and causes at least part of the upper portion side of the screen main body 16 to emit light.

According to this configuration, by causing the upper portion side of the screen main body 16 located in the front of the driving position 11a to emit light, it is possible to efficiently perform information display such as direction indication for the driver. Since the screen main body 16 stands at the front of the driving position 11a of the motorcycle 1, it is possible to perform information transmission to the driver while reducing the eye line movement for confirming information by the driver.

Further, in the information display device 21 of the apparatus described above, the screen main body 16 is a transparent or translucent panel member, and the light guide member 25 is constituted of a transparent or translucent optical fiber.

According to this configuration, even when the light guide member 25 is arranged on the transparent screen main body 16 of the motorcycle 1, the light guide member 25 can be inconspicuous, and it is possible to maintain a good appearance.

Further, in the information display device 21 of the apparatus described above, the light guide member 25 is arranged to be inserted in the inside of the horizontal cross-section of the screen main body 16.

According to this configuration, the light guide member 25 can be inconspicuous, and it is possible to improve the appearance.

Both the front and rear surfaces of the screen main body 16 when seen from the driving position 11a can be maintained to be smooth. It is possible to prevent disturbance from reaching the light guide member 25.

Further, in the information display device 21 of the apparatus described above, the light guide member 25 may be arranged to be exposed to any one of the rear surface 16b of the screen main body 16 that faces the driving position 11a side and the front surface 16a of the screen main body 16 that faces the opposite side of the driving position 11a.

According to this configuration, the light guide member 25 can be easily arranged, and it is possible to facilitate manufacturing of the screen main body 16 that incorporates the light guide member 25.

Further, in the information display device 21 of the apparatus described above, the light guide member 25 may be arranged along the outer circumferential edge 28 of the screen main body 16.

According to this configuration, the light guide member 25 can be easily arranged, and it is possible to facilitate manufacturing of the screen main body 16 that incorporates the light guide member 25. Both the front and rear surfaces of the screen main body 16 when seen from the driving position 11a can be maintained to be smooth.

Further, in the information display device 21 of the apparatus described above, the light source 23 that causes the light emission portion 22 of the screen main body 16 to emit light via the light guide member 25 is arranged on the vehicle body front part 14A.

According to this configuration, it is possible to reduce the weight of the screen main body 16 and reduce shaking, vibration, and the like of the screen main body 16 compared to a case where the light source 23 is arranged on the screen main body 16. Even in a configuration where the screen main body 16 moves upward and downward, the load of an actuator can be reduced.

Further, in the information display device 21 of the apparatus described above, the screen main body 16 constitutes the windscreen 15 that is arranged on the upper portion of the front cowl 14 at the vehicle body front part 14A of the motorcycle 1.

According to this configuration, the information display device 21 can be used as an indicator lamp such as a winker and a driving assist system included in the motorcycle 1, or can be used as a display device of a travel direction of a navigation system. As a result, information provided to the driver during traveling of the vehicle can be provided to the driver with a little eye line movement.

Further, in the information display device 21 of the apparatus described above, the motorcycle 1 has an output device (the display screen 18) that outputs navigation information, and a plurality of light emission portions 22 of the screen main body 16 are provided to be distributed to right and left sides of the vehicle body, are arranged symmetrically in the rightward-leftward direction with respect to the vehicle body rightward-leftward middle CL, and emit light in response to the navigation information.

According to this configuration, information (for example, right-left turn information of a course) relating to the right and left sides of the vehicle body in the navigation information can be easily confirmed with a little eye movement.

Further, in the information display device 21 of the apparatus described above, the navigation information is right-left turn information in the travel direction of the motorcycle 1, and the light emission portion 22 displays the right-left turn information in response to the navigation information, and the vehicle speed and the position information of the motorcycle 1.

According to this configuration, for example, when the vehicle speed of the motorcycle 1 is fast, the right-left turn information can be displayed at an early timing from a position in front of and sufficiently away from a right-left turn position, and when the vehicle speed of the motorcycle 1 is slow, the right-left turn information can be displayed at a late timing from a position relatively close to a right-left turn position. In this way, the light emission timing of the right-left turn information can be optimized in response to the vehicle speed and the position information of the motorcycle 1.

The present invention is not limited to the embodiment described above. For example, the information display device of the apparatus of the embodiment is applied to motorcycles but may be applied to saddle riding vehicles other than motorcycles. Saddle riding vehicles include all vehicles on which a driver rides by straddling the vehicle body and include not only motorcycles (including motorized bicycles and scooter-type vehicles) but also three-wheeled vehicles (including vehicles having two front wheels and one rear wheel in addition to vehicles having one front wheel and two rear wheels) or four-wheeled vehicles (four-wheeled buggies or the like). The present invention may be applied to vehicles including an electric motor as a motor. The present invention may be applied to vehicles (passenger vehicles, buses, trucks, or the like) other than saddle riding vehicles.

Further, the application of the present invention is not limited to vehicles. The present invention may be applied to various vehicles and movable bodies such as various transport apparatuses such as aircraft or ships, construction machinery, and industrial machinery. Further, the present invention is broadly applicable to apparatuses other than vehicles if the apparatus includes the standing member in the front of the operation positon such as, for example, push mowers or cleaning machines.

The configurations in the embodiment described above are merely examples of the present invention, and various changes can be made without departing from the scope of the present invention such as replacing the components of the embodiment with well-known components.

What is claimed is:

1. An apparatus information display device that is an information display device of an apparatus which is operated by an operator, comprising:
    a standing member that stands upward in front of an operation position of the apparatus and has a lower portion which is supported by an apparatus main body; and
    a light guide member that extends from an apparatus main body side toward an upper portion side of the standing member, is arranged along a predetermined portion of the standing member, and causes at least part of the upper portion side of the standing member to emit light,
    wherein a light emission portion that emits light using light guided by the light guide member is arranged on an upper end edge exposed to an operation position side in the standing member.

2. The apparatus information display device according to claim 1,
    wherein the standing member is a transparent or translucent panel member, and
    the light guide member is constituted of a transparent or translucent optical fiber.

3. The apparatus information display device according to claim 1,
    wherein the light guide member is inserted in an inside in a horizontal cross-section of the standing member.

4. The apparatus information display device according to claim 1,
    wherein the light guide member is exposed to any one of a first surface of the standing member that faces an operation position side and a second surface of the standing member that faces an opposite side of the operation position.

5. The apparatus information display device according to claim 1,
    wherein the light guide member is arranged along an outer circumferential edge of the standing member.

6. The apparatus information display device according to claim 1,
    wherein a light source that causes the light emission portion of the standing member to emit light via the light guide member is arranged on the apparatus main body.

7. The apparatus information display device according to claim 1,
    wherein the apparatus is a saddle riding vehicle on which a driver rides by straddling a vehicle body, and
    the standing member constitutes a windscreen that is arranged on an upper portion of a front cowl at a vehicle body front part.

8. The apparatus information display device according to claim 1,
    wherein the apparatus is an automobile on which a driver rides,
    the automobile has an output device that outputs navigation information, and
    a plurality of light emission portions that are provided on the standing member are distributed to right and left sides of a vehicle body, are arranged symmetrically in a rightward-leftward direction with respect to a vehicle body rightward-leftward middle, and emit light in response to the navigation information.

9. The apparatus information display device according to claim 8,
    wherein the navigation information is right-left turn information in a travel direction of the automobile, and
    the light emission portion displays the right-left turn information in response to the navigation information, and vehicle speed and position information of the automobile.

* * * * *